United States Patent [19]

Tunmore et al.

[11] Patent Number: 4,982,207

[45] Date of Patent: Jan. 1, 1991

[54] HEATING PRINT-PLATEN CONSTRUCTION FOR INK JET PRINTER

[75] Inventors: David F. Tunmore, Miamisburg, Ohio; Michael J. Poccia, Penfield, N.Y.

[73] Assignee: Eastman Kodak Company, Rochester, N.Y.

[21] Appl. No.: 415,843

[22] Filed: Oct. 2, 1989

[51] Int. Cl.[5] ...................... G01D 15/24; G01D 15/18; B65H 29/32; B41J 11/00

[52] U.S. Cl. ...................................... 346/138; 346/75; 346/140 R; 271/196; 271/276; 400/659; 400/662

[58] Field of Search ...................... 346/75, 140 R, 138; 271/196, 276; 400/662, 659

[56] References Cited

U.S. PATENT DOCUMENTS

| | | | |
|---|---|---|---|
| 4,268,841 | 5/1981 | Fujii et al. | 346/138 |
| 4,340,893 | 7/1982 | Ort | 346/1.1 |
| 4,645,195 | 2/1987 | Scranton et al. | 271/246 |
| 4,811,038 | 3/1989 | Gordon et al. | 346/140 R |

FOREIGN PATENT DOCUMENTS

| | | |
|---|---|---|
| 54-145138 | 11/1979 | Japan . |
| 54-151446 | 11/1979 | Japan . |
| 55-846670 | 6/1980 | Japan . |
| 58-188685 | 11/1983 | Japan . |

OTHER PUBLICATIONS

Xerox Disclosure Journal, vol. 7, No. 5, Sep./Oct. 1982, pp. 313, 317–318, David Markham, Karl B. Ayash, Kent Hemphill & Youti Kuo.

*Primary Examiner*—Bruce A. Reynolds
*Assistant Examiner*—Gerald E. Preston
*Attorney, Agent, or Firm*—John D. Husser

[57] ABSTRACT

An improved heater construction for an ink jet printer of the kind having a rotary print platen for holding and transporting a print sheet through a print path. The platen heater includes a hollow shell mounted for rotation through the print path and has vacuum holes for sheet attachment. A heating foil is detachably mounted in heat transfer relation with a major portion of the interior periphery of said shell and is coupled by brush contacts to an electrical power source.

8 Claims, 3 Drawing Sheets

HEATING PRINT-PLATEN CONSTRUCTION FOR INK JET PRINTER

FIELD OF INVENTION

The present invention relates to ink jet printers of the kind having a print-platen that holds and rotates a print sheet while an ink jet print head prints upon sheet regions rotating therepast and, more specifically, to a print-platen, for such a printer, that is constructed to heat print sheets during the printing operation.

BACKGROUND ART

In ink jet printers, of both the drop on demand and continuous kinds, there is a basic conflict between two attributes desired for the printing inks. On the one hand, it is very desirable that the ink on a printed output sheet not be smearable, e.g., when fed to an output tray or pick-up for handling. This mitigates toward quick-dry ink characteristics. On the other hand, the ink jet printer will have conditions of non-use, e.g. over-nights, and it is desirable that the inks used for printing do not clog the fluid system, e.g. by drying in critical locations such as the printing orifices.

Various solutions have been devised to reduce the "smear or clog" problems. Ink has been modified to absorb more rapidly into the sheet; however, this can cause spreading and reduced print sharpness. Special ink-fixing paper can be utilized; however, this increases material costs and can detract from the output sheet characteristics. Special storage and start-up procedures can be utilized to avoid ink clogging in the printer; however, this adds to printer cost and complexity.

Another approach has been to heat the print sheet and/or ink image to dry the ink more quickly. Radiant energy lamp sources have been provided on the output sheet path for this purpose, but must be controlled carefully not to darken or burn the print sheet. Rollers with embedded heat sources have been used to transfer heat by conduction to the back of a print sheet. This contact heating approach is desirable; however, it too has had drawbacks. Either a separate sheet heating roller must be provided along the sheet feed path, or a roller portion of the normal sheet support and transport system must be heated. Separate heating rollers add cost and require space. The incorporation of a heater into operative sheet transport system components has involved replacement of the entire sheet feed component, when the heater fails.

SUMMARY OF INVENTION

An important purpose of the present invention is to provide improved constructions for heating the print sheets of ink jet printers to reduce the problems outlined above. In one aspect the present invention provides a heater construction which can be incorporated into the print-platen of an ink jet printer in a readily replacable manner. In another aspect the heater construction of the present invention provides highly efficient energy transfer to the print sheet during its dwell period on the print-platen so that ink penetration into the print sheet is enhanced. By using the print-platen heating approach of the present invention in combination with a system wherein the print sheet is rotated multiple passes during the print cycle, the ink drying is further enhanced. In another related aspect, the heating construction of the present invention allows heating of a print-platen which utilizes internal platen vacuum for attaching the sheets to the platen during printing.

In one embodiment the present invention constitutes an improved print-platen construction for an ink jet printer. The print-platen comprises a hollow shell mounted for rotation through the print path and having sheet attachment holes through its periphery, a vacuum source coupled to the shell interior, a heating foil detachably mounted around a major portion of the interior periphery of the hollow shell; and brush contacts for coupling said heating foil to an electrical power source.

BRIEF DESCRIPTION OF DRAWINGS

The subsequent description of preferred embodiments of the invention refers to the accompanying drawings wherein.

DETAILED DESCRIPTION OF PREFERRED EMBODIMENTS

Figure 1:
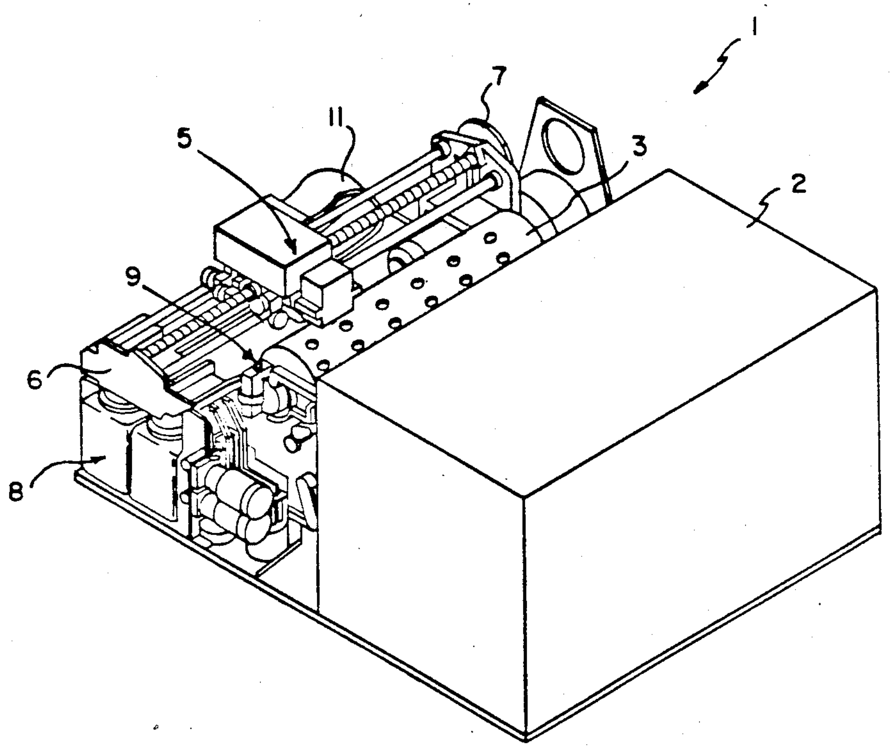
FIG. 1 is a perspective view of one ink jet printing apparatus which can incorporate the present invention.

Referring to FIG. 1, a continuous ink jet printer incorporating the present invention is illustrated schematically. It will be appreciated, however, that the print-platen constructions of the present invention can be used with other kinds of ink jet printers, e.g. ink drop-on-demand printers. The printer 1 in general comprises a paper feed sector 2 from which sheets are fed to the print-platen 3. One exemplary sheet feed and output system which can be used in the FIG. 1 printer is described in U.S. Pat. No. 4,645,195. In operation, a sheet is fed to and secured around the periphery of the print-platen 3 and a print head 5 is indexed sequentially (by drive 7 of carriage assembly 6) during succesive shell revolutions to print successive lines on the sheet rotating thereunder.

In the continuous ink jet printer embodiment shown in FIG. 1, ink is circulated from ink supply 8 to print head 5 via umbilical 11. Unused ink is circulated backk to the supply 8. Exemplary details of ink circulation systems and print head structures for generating continuous drop streams and selectivity charging and catching non-print drops are set forth in U.S. Pat. No. 4,591,870, which also describes the detail structure and function of print head start-up and storage station 9 shown in FIG. 1.

Figure 2:
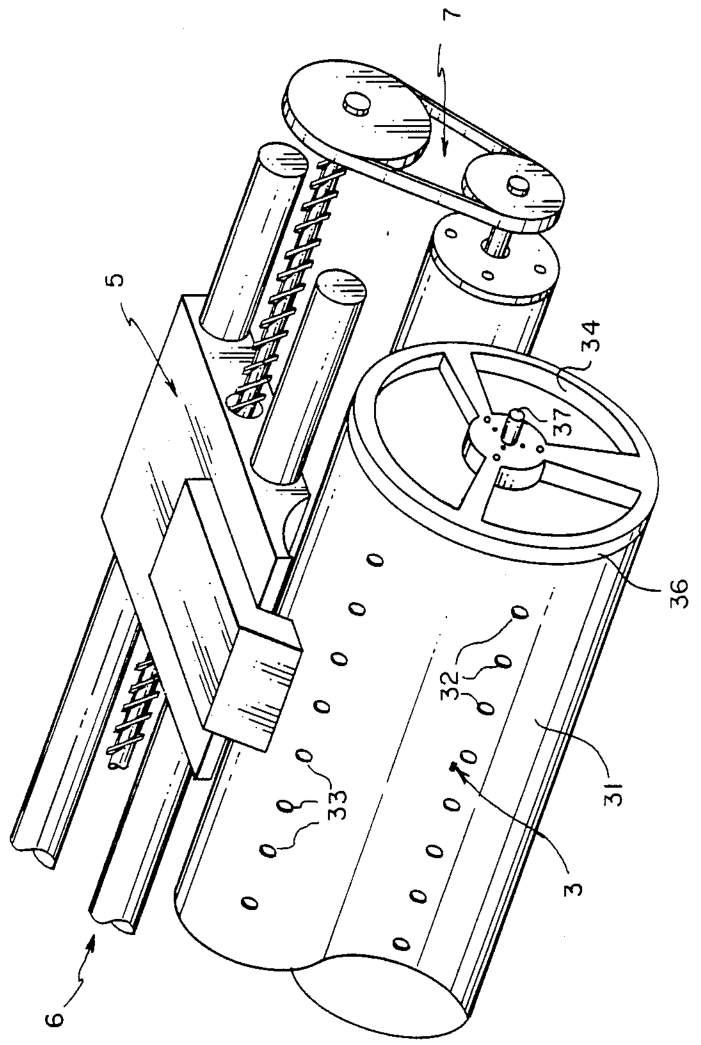
FIG. 2 is an enlarged perspective view showing print-platen, print head and carriage portions of the FIG. 1 printer.
Figure 3:
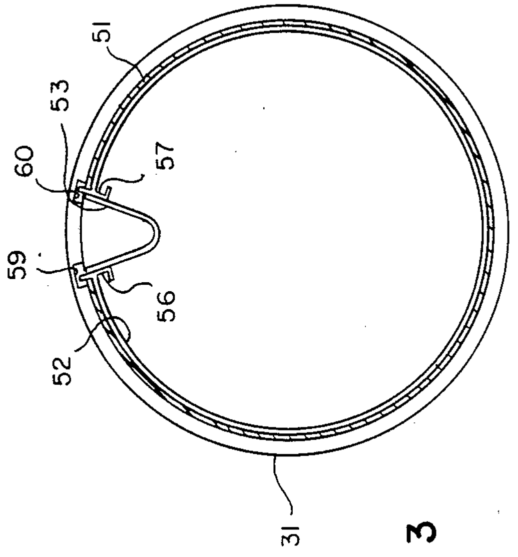
FIG. 3 is a cross-sectional view of one preferred embodiment of a print-platen construction in accord with the present invention which can be used with the FIG. 1 printer.
Figure 4:
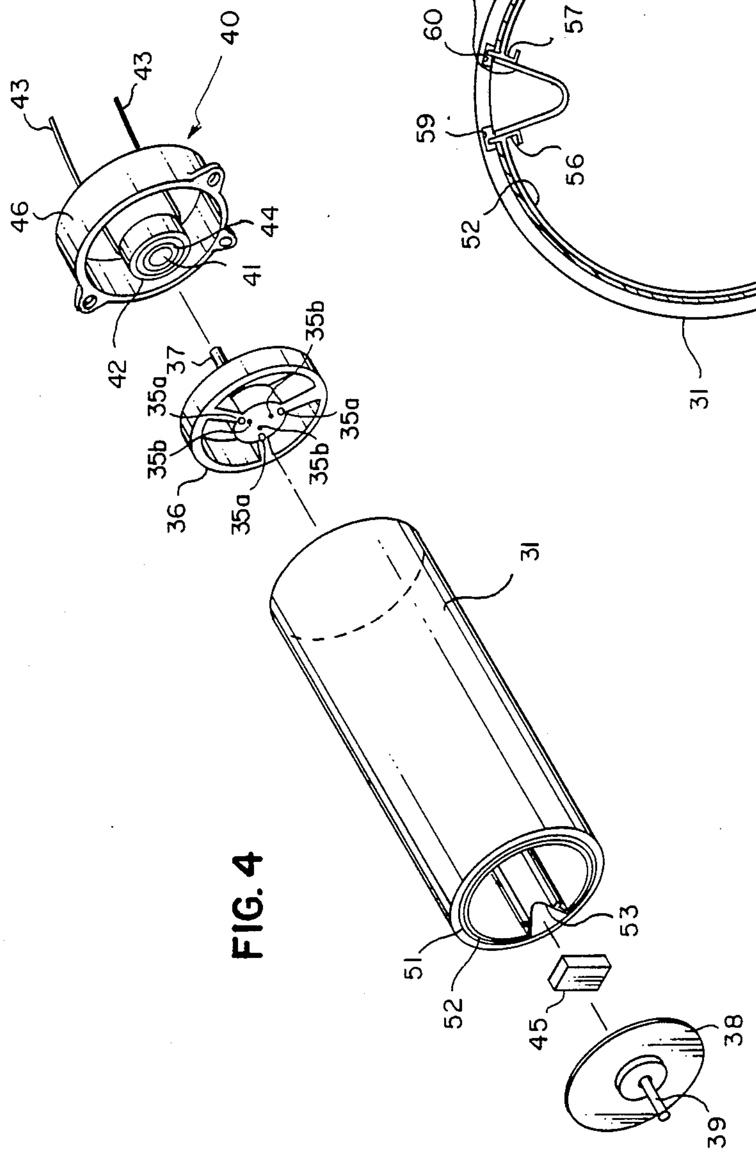
FIG. 4 is an exploded perspective view of the print-platen embodiment shown in FIG. 1.

Referring now to FIGS. 2–4 it can be seen that print platen 3 comprises a cylindrical shell 31, which is formed of a heat conductive material (e.g. aluminum). Shell 31 has sheet attachment hole arrays 32, 33 formed therethrough to secure lead and trail ends of sheets via a vacuum condition provided to the shell interior through openings 34 formed in one shell end cap 36. The end cap 36 also comprises a bearing shaft 37 and has inner and outer three-brush sets 35*a*, 35*b* extending therethrough to contact rings 42, 44 on assembly 40 (see FIG. 4). In FIG. 4, it also can be seen that the end collar assembly 40, which can be affixed to the housing of printer 1, as a journal 41 for shaft 37 that is interior of a slip rings construction 44. The slip rings are coupled to ground and power leads 43 to supply electrical power to the platen heater via brush sets 35. The collar 46 of assembly 40 slidingly seals the periphery of end 36 to a vacuum source (not shown).

End cap 38 is attached to the opposite end of shell 31 and has a support shaft 39. A heater controller, shown schematically as 45, is mounted on the interior of end cap 38. The controller 45 is coupled into the circuit of the heater unit 51, described below, and regulates the power supplied to leads 43.

Referring now to FIG. 3 as well as FIG. 4, the construction of the print-platen heater can be seen in more detail. Thus, heater unit 51 can comprise an etched foil heater embedded in fiberglass reinforced silicon rubber and is in the form of a flexible foil of predetermined size relative to the interior of the shell 31. More specifically, the foil has a length approximately equal to the length of the shell and a width that is less than the inner periphery of the shell by an amount approximately equal to the width of wedge member 53. The heater unit foil is also formed with openings adapted to be aligned with openings 32 of the shell 31.

A spring retainer sheet 52, of approximately the same size as heater foil 51, has flanges 56, 57, which are constructed to abut the surfaces of wedge member 53, as shown best in FIG. 4. The spring retainer sheet also has openings located to align with the shell and heater foil openings and locator tabs 56, 57. The combination of heater foil 51, spring retainer sheet 52 and wedge member 53 provide a simple and effective assembly which can be easily inserted into and replaced from intimate heat contact relation with the shell 31.

In the assembly procedure, the heater foil 51 is located onto the spring retainer sheet 52 by means of locating tabs to insure correct alignment of the sheet on foil openings. The heater/retainer sub-assembly, is then wrapped around a mandrel smaller in diameter than the shell inner diameter and positioned inside the shell. Once inside the shell, the upper extensions of locating tabs 56, 57, which locate the heater to the retainer, locate the heater/retainer sub-assembly to the inside periphery of the shell via shell recesses 59, 60. Once the heater foil/retainer sheet sub-assembly is so located, the mandrel is removed leaving the heater/retainer sub-assembly inside the shell. The heater/retainer is designed to wrap around the inside shell periphery 340° of the total 360°. The wedge 53 is then pushed into the 20° space formed between the flanged edges of the tabs 56, 57 of the retainer. The tabs slide apart within recess 59, 60 forcing the retainer towards the surface of the shell and thereby insuring intimate contact of the heater element to the shell surface.

In operation, a 120 VAC power source is supplied to the heater foil through the slip ring assembly 42, which is positioned in the open end of the shell assembly, so as not to restrict air flow. As shown in FIGS. 2 and 3, three contact brushes 38 are used in each line to reduce electrical noise. The closed loop control circuit 45 mounted to end cap 38 maintains a running temperature of 135°±5° F. Preferably, a one shot over-temperature cutout switch is provided to prevent the shell temperature from exceeding a maximum, e.g. 200° F.

The platen heater system concept described above performs effectively by providing heat to a printed sheet during its dwell time on the print-platen. This occurs by virtue of the effect of heat transfer through the platen shell both increase the ink penetration of impacting ink drops into the print shell and by drying the ink prior to feed-off of the sheet from the platen. In addition, the assembly is designed so the heat foil is readily replacable without necessitating replacement of other portions of the platen.

The invention has been described in detail with particular reference to certain preferred embodiments thereof, but it will be understood that variations and modifications can be effected within the spirit and scope of the invention.

We claim:

1. In an ink jet printer of the kind having a rotary print platen for holding and transporting a print sheet through a print path, the improvement wherein said print platen comprises:

(a) a hollow shell mounted for rotation through the print path and having sheet attachment holes through its periphery;

(b) means or providing a vacuum to the shell interior;

(c) a heating foil detachably mounted in heat transfer relation with a major portion of the interior periphery of said shell; and (d) brush contact means for coupling said heating foil to an electrical power source.

2. The invention defined in claim 1 wherein said foil is flexible and further comprising a spring sheet located interior of said heating foil and having a resilient restoring force sufficient to force said foil surfaces into intimate contact with the inner periphery of said shell.

3. The invention defined in claim 2 wherein said foil and spring sheet in their mounted condition have a periphery less than the inner periphery of said shell and further comprising wedge means for detachably interfitting between ends of said spring sheet and urging the ends apart to force said foil toward said sheet.

4. The invention defined in claim 1 wherein said foil is flexible and further comprising a spring sheet located interior of said heating foil and having a resilient restoring force sufficient to force said foil surfaces into intimate contact with the inner periphery of said shell.

5. The invention defined in claim 4 wherein said foil and spring sheet in their mounted condition have a periphery less than the inner periphery of said shell and further comprising wedge means for detachably interfitting between ends of said spring sheet and urging the ends apart to force said foil toward said sheet.

6. The invention defined in claim 1 wherein said foil is flexible and further comprising retainer sheet means located interior of said heating foil and exerting a resilient expansion force sufficient to hold said foil surfaces in intimate contact with the inner periphery of said shell.

7. The invention defined in claim 1 wherein said foil is flexible and further including a retainer sheet which in its mounted condition has a periphery less than the inner periphery of said shell and wedge means for detachably interfitting between ends of said retainer sheet and urging the ends apart to force said foil toward said shell interior periphery.

8. In an ink jet printer of the kind having a rotary print platen for holding and transporting a print sheet through a print path, the improvement wherein said print platen comprises:

(a) a hollow shell mounted for rotation through the print path;

(b) a heating foil detachably mounted around a major portion of the interior periphery of said shell; and (c) brush contact means for coupling said heating foil to an electrical power source.

* * * * *